Aug. 22, 1972         E. GÜRTLER         3,686,060
MULTI-LAYER WRAPPING SHEET COMPRISING A PLASTIC FILM, A
BITUMEN LAYER AND A KRAFT PAPER LAYER; THE LAYERS
BEING NON-COEXTENSIVE ON ONE EDGE
Filed March 8, 1971
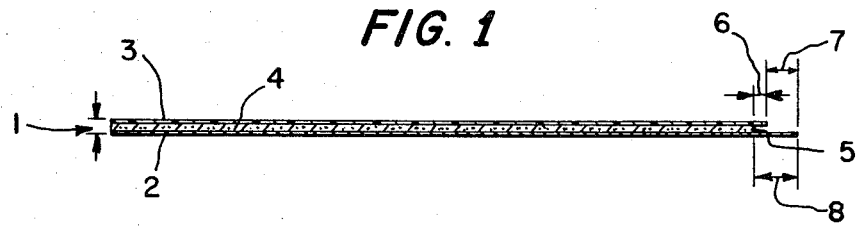
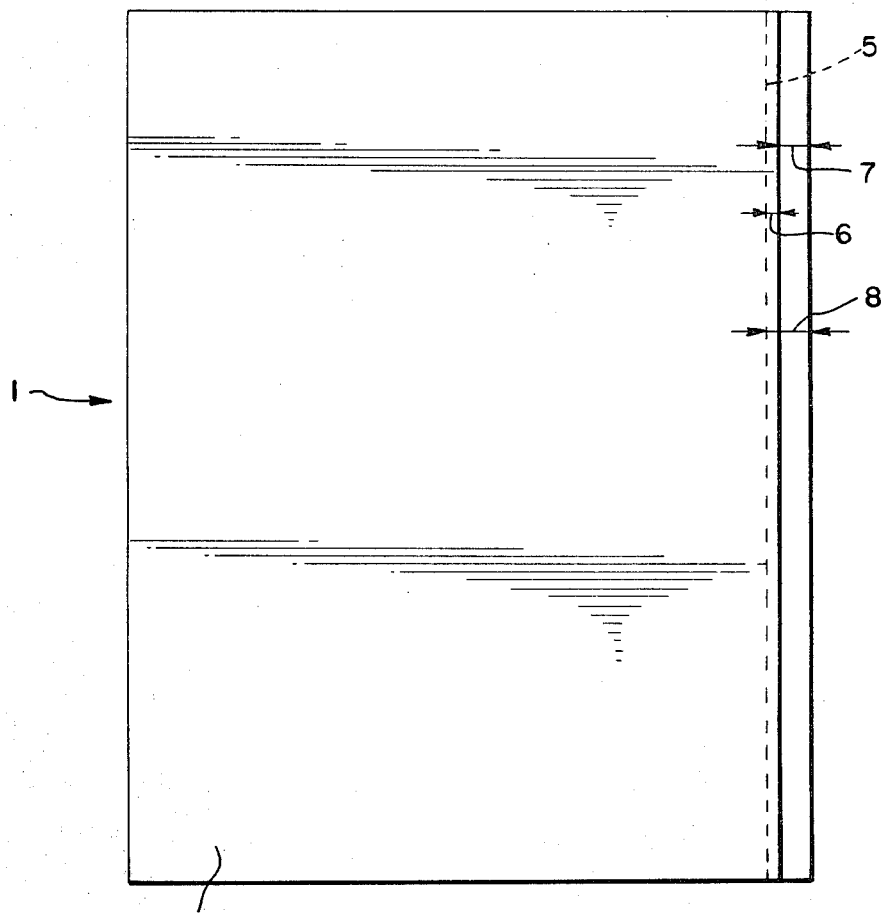
INVENTOR
EDGAR GÜRTLER
BY    *James E. Bryan*
ATTORNEY

United States Patent Office 3,686,060
Patented Aug. 22, 1972

3,686,060
MULTI-LAYER WRAPPING SHEET COMPRISING A PLASTIC FILM, A BITUMEN LAYER AND A KRAFT PAPER LAYER; THE LAYERS BEING NON-COEXTENSIVE ON ONE EDGE
Edgar Gürtler, Wiesbaden, Germany, assignor to Kalle Aktiengesellschaft, Wiesbaden-Biebrich, Germany
Filed Mar. 8, 1971, Ser. No. 121,787
Claims priority, application Germany, Mar. 9, 1970,
G 70 08 555.1
Int. Cl. B32b *11/06;* B65d *65/16*
U.S. Cl. 161—39
10 Claims

ABSTRACT OF THE DISCLOSURE

The present invention relates to a laminated multilayer wrapping sheet for light-sensitive paper comprising a flexible plastic layer, an intermediate bitumen layer and an outer layer of kraft paper. The laminate has a marginal zone of paper free of plastic and bitumen and the plastic layer extends beyond the bitumen layer in the direction of the marginal zone of paper.

---

For preventing damage by mechanical action or light and gases, light-sensitive papers are protected by wrapping them with flexible wrapping material of suitable strength and sufficient light- and gas-impermeability.

Sheet wrapping materials are known for this purpose, which are formed from three layers in a manner such that they include a paper layer, a plastic layer, and a bitumen layer between these two layers. In the known sheets of wrapping material of this kind, the individual layers of the laminated sheet have the same size and are superposed in a manner such that the peripheral surfaces of the individual layers are in alignment with one another. A known sheet of this kind is suitable to form a wrapping around the article to be wrapped, which protects the article against mechanical, physical or chemical action but, in packaging machines, difficulties arise with respect to the economical production of such wrappings around articles. In the overlapping zone of the wrapping material within the wrapping around the wrapped article, the paper surface of the laminate adjoins the plastic surface thereof. In order to guarantee a sufficiently stable bond within this zone, it is necessary for closing the wrapping to use a so-called hot melt adhesive or adhesives containing organic polymers dissolved in organic solvents. The use of such adhesives has the disadvantages that the packaging machines are very rapidly contaminated and often must be cleaned.

The present invention provides a wrapping sheet which does not have the disadvantages of the known sheet during the formation of a wrapping therefrom around an article to be wrapped, particularly around light-sensitive paper, and permits the economical formation of sufficiently tightly closed wrappings around articles in high-speed packaging machines for sheets with the use of water-soluble adhesives for closing the wrapping material. Due to the marginal closure zone of the laminated sheet, which is free from bitumen and film material, the wrapping of the sheet of the invention may be closed by bonding paper to paper, which is possible by means of water-soluble glue.

The laminated sheet is particularly suitable for use as a wrapping material for wrapping sheets of light-sensitive paper, and includes a flexible plastic layer, a layer of kraft paper, and a bitumen layer between the other two layers. The sheet has one or two opposite marginal zones free from plastic and bitumen layers and the plastic layer of the laminate extends beyond the bitumen layer edge adjoining the marginal zone and over the marginal zone without being connected therewith and without completely covering it.

The flexible multi-layer wrapping sheet of the invention incluudes a layer of kraft paper, a layer of plastic material, and a layer of bitumen between these two layers. The three layers are superposed and firmly united with one another. In the zone of three lateral surfaces of the sheet which adjoin one another rectangularly, the peripheral surfaces of the layers of the laminate are in alignment with one another. In the zone of the fourth border, the laminate has a marginal zone of paper which is free from plastic material and bitumen, part of the plastic layer in the form of a strip having the same width over its length extending in the direction of the longer outside edge of this rectangular marginal zone beyond the bitimen layer. This film strip has a smaller width than has the marginal closure zone of paper. The strip-like part of the plastic layer which extends beyond the bitumen layer is not secured to the paper surface of the marginal zone. The marginal zone of the laminate has the same width over its entire length. The marginal closure zone has a rectangular shape, preferably with two longer and two shorter lateral edges. The sheet of the invention also may have such a shape that it has two opposite lateral surfaces within which the peripheral surfaces of the individual layers are in alignment with one another and has two opposite marginal zones of the above-described form. The lateral surface of the sheet means that surface the shorter side of which determines the thickness of the part of the laminate including three superposed layers.

The paper zone of the laminate which is free from plastic and bitumen layers also is designed as the marginal closure zone of the laminated sheet.

The peripheral surface of a layer of the laminate is that surface the longer side of which determines the length of the layer and the shorter side of which determines the thickness of the layer.

The laminated sheet preferably is rectangular. In a particularly preferred embodiment, the rectangular laminated sheet has two longer and two shorter lateral edges and has a marginal closure zone the longer lateral edge of which corresponds to the length of the longer lateral edge of the sheet.

The laminated sheet has a weight in the range of 80 to 180 g./m.$^2$, particularly in the range of 120 to 150 g./m.$^2$. The tear resistance of the laminated sheet of the invention is in the range of 150 to 500 cm.·g./cm. (Brecht-Imset), particularly, however, in the range of 200 to 400 cm.·g./cm. (Brecht-Imset).

The paper layer of the laminated sheet comprises kraft paper of a weight in the range of 50 to 150 g./m$^2$, preferably in the range of 80 to 120 g./m.$^2$, especially preferably, however, of a weight of 95 g./m.$^2$. The paper layer has a tear resistance in the range of 100 to 400 cm.·g./cm. (Brecht-Imset), particularly, however, in the range of 150 to 350 cm.·g./cm. (Brecht-Imset).

The plastic layer of the laminated sheet comprises thermoplastic synthetic material. Any plastic material is suitable which assures a sufficient strength of the layer; particularly preferred is a layer of a biaxially stretched polypropylene film. The film has a thickness in the range of 10 to 30$\mu$, preferably it has a thickness of 12$\mu$.

The black bitumen layer has a thickness in the range of 20 to 200 g./m.$^2$, particularly in the range of 30 to 40 g./m.$^2$.

The marginal zone has a width in the range from 1 to 50 mm., particularly a width of 1 to 30 mm.

The plastic layer extends only slightly beyond the edge of the bitumen layer in the direction of the bitumen-free paper layer of the sheet, the purpose of the transition being to prevent unintentional contact with the bitumen layer during processing of the laminated sheet into a wrapping. The plastic layer extends beyond the bitumen layer only to such an extent that a sufficiently wide closure zone covered with the plastic layer is maintained. In the closure zone, the plastic layer extends 1 to 3 mm. beyond the bitumen layer.

Between the part of the plastic layer extending beyond the bitumen layer and the bitumen-free surface of the paper layer, there is a space the height of which is determined by the thickness of the bitumen layer and the width of which is determined by the part of the plastic layer extending beyond the bitumen layer.

The accompanying drawing further illustrates the invention, in which:

FIG. 1 is a diagrammatic longitudinal sectional view of a laminated wrapping sheet of the invention, and FIG. 2 is a diagrammatic plan view showing a preferred laminated wrapping sheet according to the invention.

In FIG. 1, numeral 1 designates the laminated wrapping sheet as a whole, numeral 2 the paper layer thereof, numeral 3 the plastic layer, and numeral 4 the bitumen layer. Numeral 5 designates the transition edge between the latter layer and the bitumen-free zone of the paper layer of the sheet. Numeral 6 designates that part of the plastic layer 3 which extends beyond the bitumen layer 4. Numeral 7 designates the paper zone of the sheet which is free from plastic and bitumen layers and serves for bonding, and numeral 8 designates the entire bitumen-free zone of the paper layer 2.

In FIG. 2, numerals 1, 2, 3, 4, 5, and 6 have the same meanings as in FIG. 1, the dotted line 5 represents the line from which the marginal closure zone of the paper layer 2 extends and which is free from the bitumen layer.

It will be obvious to those skilled in the art that many modifications may be made within the scope of the present invention without departing from the spirit thereof, and the invention includes all such modifications.

What is claimed is:

1. A laminated sheet, particularly for use as a wrapping material for light-sensitive paper, comprising a flexible plastic layer, a layer of kraft paper, and an intermediate layer of bitumen, the sheet having at least one marginal zone free of plastic and bitumen layers, and the plastic layer extending beyond the edge of the bitumen layer adjoining the marginal zone and over a portion of said zone.

2. A laminated sheet according to claim 1 having a rectangular shape with two longer and two shorter lateral edges, the length of the marginal zone being coextensive with the length of the sheet.

3. A laminated sheet according to claim 1 in which the marginal zone free of plastic material and bitumen has a width in the range of 1 to 50 mm.

4. A laminated sheet according to claim 1 in which the marginal zone has a width of 30 mm.

5. A laminated sheet according to claim 1 in which the plastic layer is a plastic film.

6. A laminated sheet according to claim 1 in which the plastic layer is a biaxially stretched polypropylene film.

7. A laminated sheet according to claim 6 in which the film has a thickness of $12\mu$.

8. A laminated sheet according to claim 1 in which the paper layer has a weight of 95 g./m.$^2$ and a tear resistance of 350 cm.·g./cm. (Brecht-Imset).

9. A laminated sheet according to claim 1 in which the bitumen layer has a weight in the range of 30 to 40 g./m.$^2$.

10. A laminated sheet according to claim 1 in which the plastic layer extends 1 to 3 mm. beyond the edge of the bitumen layer.

References Cited
UNITED STATES PATENTS

| | | | |
|---|---|---|---|
| 3,551,267 | 12/1970 | Addison, Jr. | 161—238 X |
| 2,688,331 | 9/1954 | Bogoslowsky | 161—147 X |
| 2,955,331 | 10/1960 | Nelson | 229—87 R X |

ROBERT F. BURNETT, Primary Examiner

L. T. KENDELL, Assistant Examiner

U.S. Cl. X.R.

161—145, 238, 250, 147; 229—3.5 R, 87 R; 206—46